Patented Sept. 12, 1922.

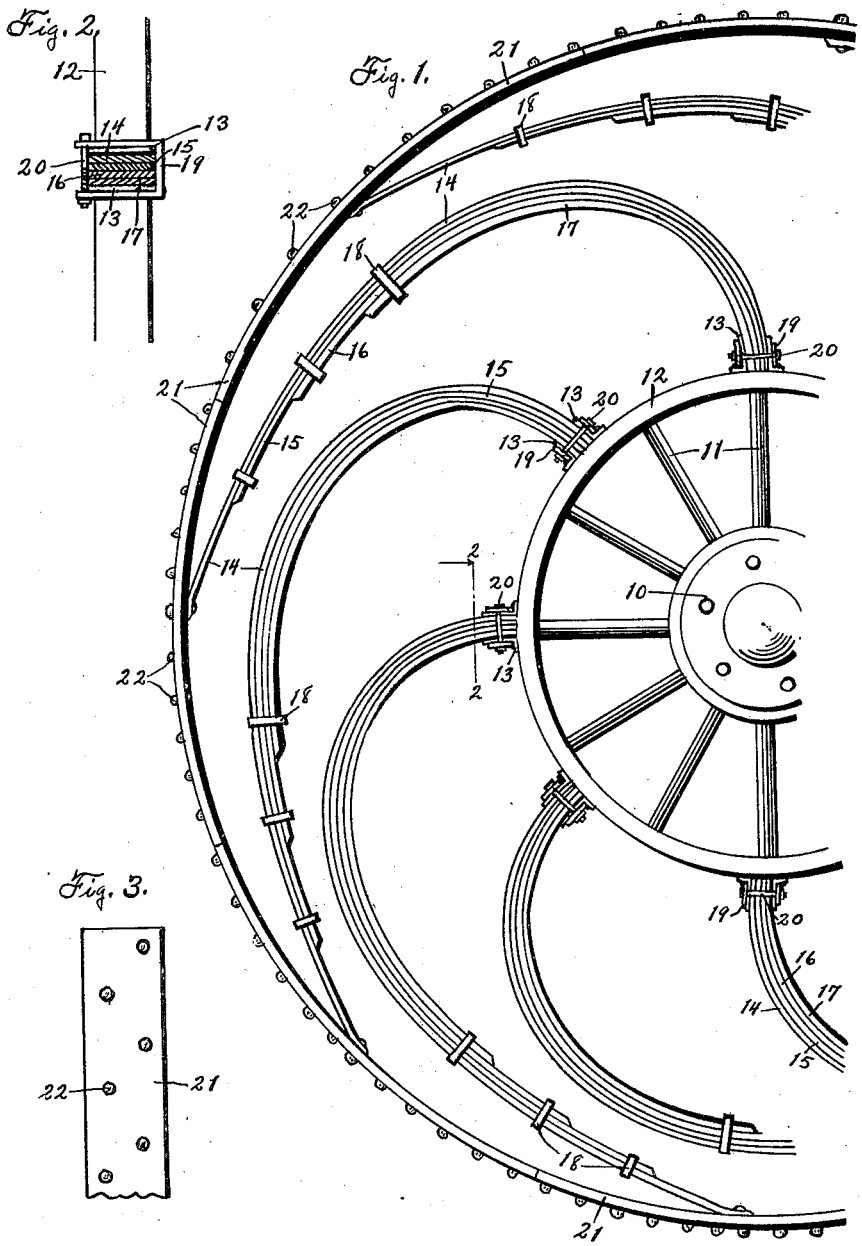

1,428,575

UNITED STATES PATENT OFFICE.

DAVID YOAKAM, OF LIBERTY TOWNSHIP, WARREN COUNTY, IOWA.

SPRING WHEEL.

Application filed October 13, 1919. Serial No. 330,360.

*To all whom it may concern:*

Be it known that I, DAVID YOAKAM, a citizen of the United States of America, and resident of Liberty Township, Warren County, Iowa, have invented a new and useful Spring Wheel, of which the following is a specification.

The object of this invention is to provide an improved construction for spring wheels for vehicles.

A further object of this invention is to provide improved means for obtaining resilience and cushioning effect in a vehicle wheel without the use of pneumatic tires.

A further object of this invention is to provide improved means for connecting spring spokes to the hub.

A further object of this invention is to provide an improved tread member.

My invention consists in the construction, arrangement and combination of elements hereinafter set forth, pointed out in my claims and illustrated by the accompanying drawing, in which—

Figure 1 is a side elevation illustrating a portion of a wheel embodying my invention. Figure 2 is a cross-section on an enlarged scale on the line 2—2 of Figure 1. Figure 3 is a face view of a portion of one of the tread members.

In the construction of the device as shown the numeral 10 designates a hub adapted to support one end of a vehicle axle (not shown). From the hub 10 radiate short spokes 11, secured at their inner ends to said hub in any suitable and approved manner, and to the outer ends of said spokes is secured a rim 12, the diameter of which preferably is not more than one-half that of the completed wheel. Spaced apart on the outer surface of the rim 12 are pairs of lugs 13, preferably of angle shape and having their longer flanges resilient and directed toward each other before the spokes are mounted therein and extending outward substantially radially after the spokes are mounted. A plurality of spring spokes are provided, one for each pair of lugs 13, which spokes extend from the rim 12 to the circumference of the wheel on curved lines. Each spring spoke is formed of a series of leaves 14, 15, 16, 17, of varying length and of any suitable number, in this instance four. The leaves 14 extend from the rim entirely to the wheel circumference, and the leaves 15, 16, 17 are of progressively less length, and all are suitably connected as by clips 18. The butt ends of the spring leaves 14, 15, 16, 17 completely and snugly fill the space between the members of the pairs of lugs 13, said members being sprung apart to receive them and U clamps 19 are provided, encompassing each pair of outer flanges of the lugs and constrict said flanges on the spring members contained therein, and securely hold said spring members in place, said U clamps being held and clamped by means of bolts 20 passing through their ends. At the outer end of each spring spoke, and securely riveted to the outer end of the longest leaves 14, are separate tread members 21, one for each of said spokes. The tread members 21 are curved from end to end on arcs of the circumference of the wheel and abut loosely adjacent similar members, and together form the tread surface of the wheel. In each tread member 21 are mounted a plurality of anti-slipping and traction studs 22, in any desired number, said studs preferably being removably and replaceably secured in place by screwing into tapped holes in said tread members.

The rim 12 may be of greater or less diameter than shown, or may be omitted altogether and the lugs 13 be mounted directly on the hub 10.

By this means sufficient resilience in the supporting wheels is secured and the troubles and expense due to the use of pneumatic tires eliminated. Any of the tread or spring members may be readily removed and replaced if necessary without disturbing the others; and more or less of the studs 22 may be employed as conditions require.

I claim as my invention—

1. A spring wheel, comprising a rigid hub structure, spaced pairs of resilient lugs extending outwardly therefrom, a group of leaf springs clamped between the members of each pair of lugs and extending outwardly on curved lines, and tread members carried by the outer ends of said springs.

2. A spring wheel, comprising a rigid hub structure, spaced pairs of resilient lugs extending outwardly therefrom, groups of spring spokes each having one end mounted between the members of a pair of said lugs, a U clamp encompassing each pair of lugs and clamping the spring spokes therein, and separate tread members carried by the outer ends of separate spring spokes.

3. A spring wheel comprising a rigid hub structure, spaced pairs of resilient lugs extending outwardly therefrom, spring spokes clamped at one end between members of said pairs of lugs and extending outwardly therefrom, said lugs being separated to admit said spokes, and a rim on the outer ends of said spokes.

Signed at Des Moines, in the county of Polk and State of Iowa, this 15th day of September, 1919.

DAVID YOAKAM.